Nov. 16, 1965     V. ECKHARDT     3,217,402
METHOD AND APPARATUS FOR PRODUCING TUBULAR METAL BODIES WITH
WELDED HELICAL SEAMS OF STRIP STOCK
Filed Dec. 31, 1962     5 Sheets-Sheet 1

INVENTOR
Vilem Eckhardt
By: Dicke & Craig
ATTORNEYS

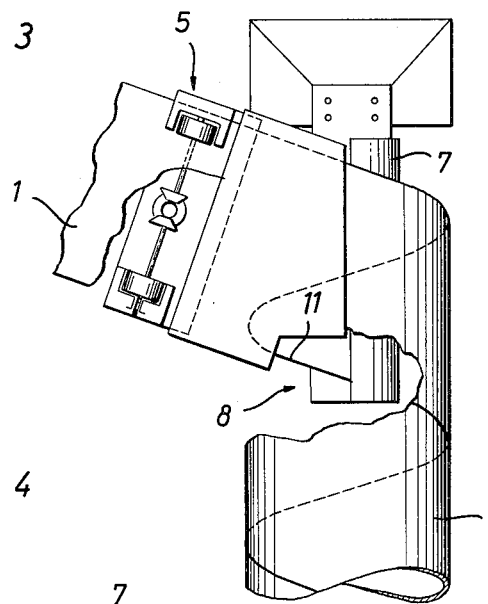
FIG. 3
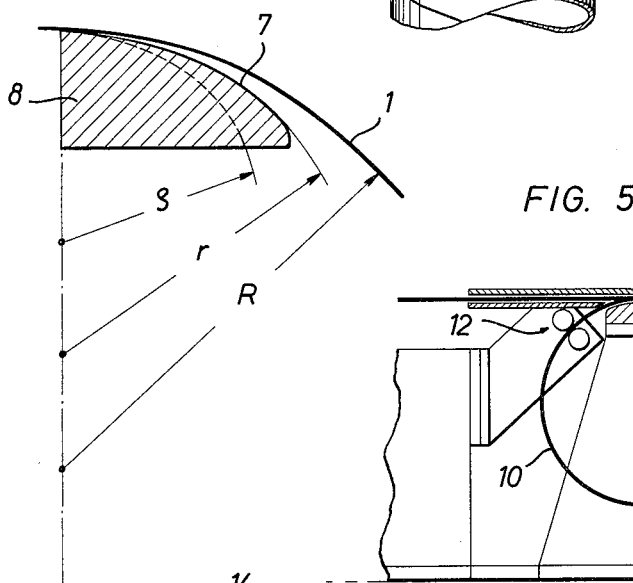
FIG. 4
FIG. 5
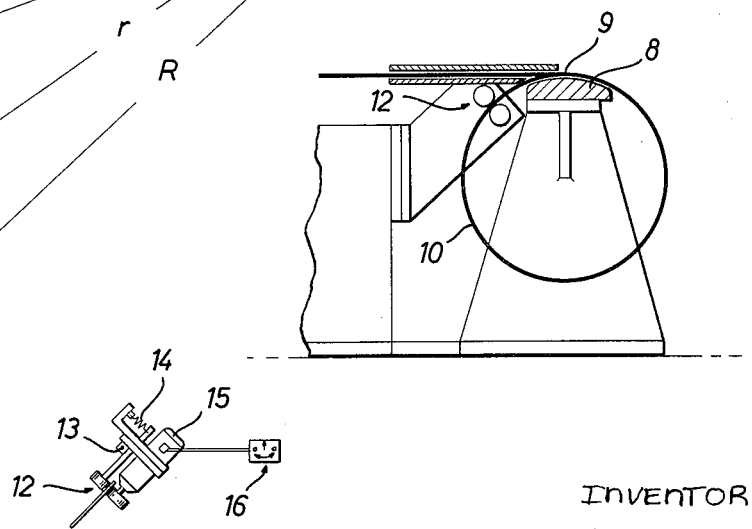
FIG. 6
INVENTOR
Vilem Eckhardt
By: Dicke & Craig
ATTORNEYS Nov. 16, 1965 V. ECKHARDT 3,217,402
METHOD AND APPARATUS FOR PRODUCING TUBULAR METAL BODIES WITH
WELDED HELICAL SEAMS OF STRIP STOCK
Filed Dec. 31, 1962 5 Sheets-Sheet 3

INVENTOR
Vilem Eckhardt
By: Dicke & Craig
ATTORNEYS

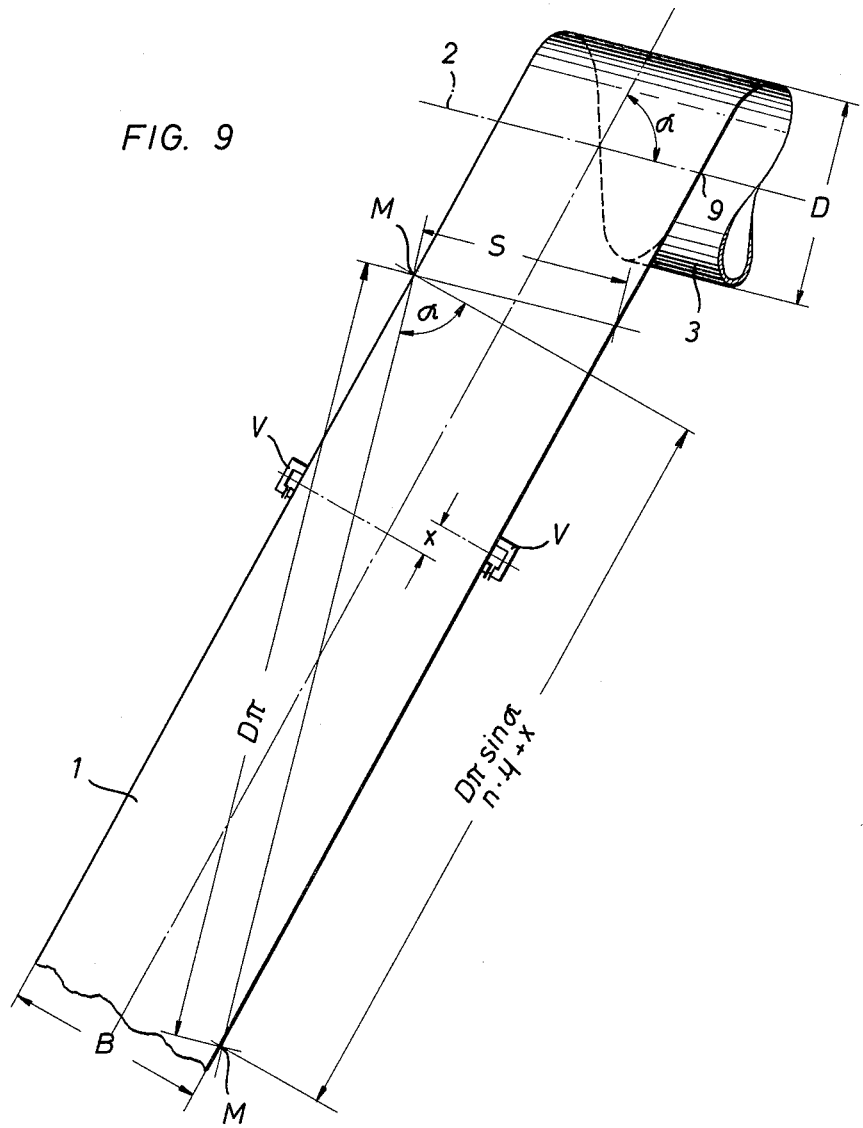

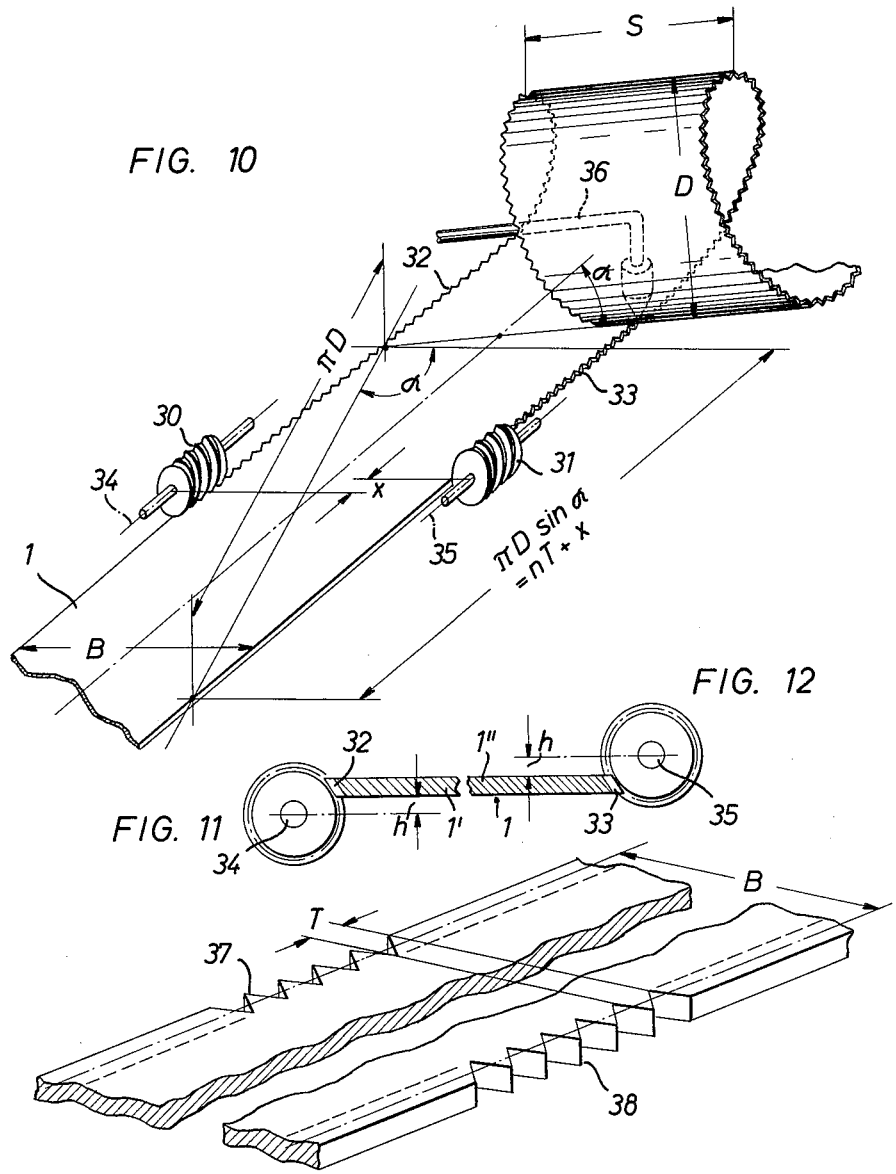

United States Patent Office 3,217,402
Patented Nov. 16, 1965

3,217,402
METHOD AND APPARATUS FOR PRODUCING TUBULAR METAL BODIES WITH WELDED HELICAL SEAMS OF STRIP STOCK
Vilem Eckhardt, Paris, France, assignor to Driam Societe Anonyme, Vaduz, Liechtenstein
Filed Dec. 31, 1962, Ser. No. 248,313
Claims priority, application Germany, Jan. 3, 1962, D 37,841; Nov. 12, 1962, D 40,261
10 Claims. (Cl. 29—477.3)

The present invention relates to a method and an apparatus for producing tubular metal bodies, such as pipes or the like, of strip stock.

Prior to this invention, tubular bodies, especially pipes, with welded helical seams have been produced by pressing a flat strip by means of a machine which is provided with driving rollers against a forming tool which consisted of a one-part, more or less closed circular element with a concave surface, provided that the pipe was not formed by being wound on a mandrel. The ratio between the diameter of the pipe and its wall thickness was relatively small, for example, 100, and only amounted in exceptional cases up to about 400.

For certain special purposes, it is, however, often necessary to produce tubular bodies of a relatively large diameter and a relatively small wall thickness which have practically no stability of shape and therefore require special precautions to be followed in their production. In such cases, the ratio between the diameter and the wall thickness of the pipe may amount to 500 to 3000 and more. If an attempt were to be made to produce such tubular bodies by means of the conventional helical seam pipe making machines, the forming process would be very difficult or even impossible because of the lack of stability of shape of these bodies.

It is therefore an object of the present invention to provide a helical seam pipe making machine which permits a relatively simple and inexpensive production of tubular bodies, especially pipes, which have a ratio between the diameter and wall thickness of the body of over 500 to 3000 and more. A further object of the invention is to provide relatively simple means for controlling the operation of the movable elements of this machine.

For attaining these objects, the invention consists in applying at least one mark in the form of a line simultaneously on both edges of the surface of the unbent strip stock and at a distance from each other in the longitudinal or feeding direction of the strip which is equal to the length of the circumference of the tubular body to be made or at a constant ratio to this length, and in guiding and forming the metal strip in such a manner that, when during the formation of the tubular body the two longitudinal edges of the strip engage with each other, the two marked lines are exactly in alignment with each other or are always spaced at a constant distance from each other. Since the diameter of the tubular bodies, for example, pipes, is relatively large, there are no difficulties in observing the marked lines which are preferably applied on the upper side of the flat strip stock before it is being curved and by controlling the movable elements of the pipe making machine to insure that the marks on both edges will always be in alignment with or at a constant distance from each other. It is advisable to feed the metal strip in a conventional manner from a point bove the axis of the tubular body to be formed and to employ the gravity of the strip for forming it into a tubular body.

It is further advisable to provide behind the guide channel through which the strip stock is being fed at least one element for supporting the strip which is preferably designed so that its supporting points lie on a surface which has a radius of curvature larger than that which is required for the plastic deformation of the strip but smaller than the radius of the finished tubular body. Furthermore, it is advisable to provide at a point preceding the welding point at least one pair of driving rollers for the curved strip, at least one of which may be driven so that the peripheral speed of these rollers normally corresponds to the feeding speed of the strip but may be varied as desired so as to differ from this feeding speed. The lines of contact between these driving rollers and the curved strip should then extend at an angle different from a right angle relative to the direction of movement of the strip, although this difference only needs to amount to 1 or 2°.

In place of a rigid supporting surface which may form the outer surface of a solid or hollow element, it is also possible to provide a supporting surface of a variable shape. This is advisable especially if the diameter of the tubular bodies to be produced changes frequently.

For applying the mentioned line marks on the strip stock, it is advisable to employ a two-armed lever which is pivotable about an axis which intersects the center line of the strip to be worked upon and extends vertically to the plane of the strip. Each arm of this lever carries a marking device and these two devices are spaced at the same distance from the pivoting axis of the lever.

According to a further object of the invention it is advisable to simplify the aforementioned procedure by eliminating the necessity of checking whether the line marks which are applied on the edges of the strip are in alignment with each other when the tubular body is formed. For attaining this object, the invention further provides the marking means to consist of appliances for producing serrations, for example, hobs, punches, or the like. The two free ends of the mentioned two-armed lever may therefore be provided with suitable means for serrating the edges of the metal strip before it is being formed or the serrating means may be associated with the two edges in such a manner that they will be disposed exactly opposite to each other when the length of the circumference of the tubular body to be produced is equal to n-times the spacing between the teeth of the serrations. If the two values do not coincide with each other, the serrating device for one edge of the strip is offset relative to the serrating device for the other edge, as seen in the direction of feed of the metal strip toward the forming tool.

If the serrations are produced by means of hobs, the axis of rotation of one hob is preferably disposed slightly above and that of the other hob slightly below the plane of the metal strip so that as soon as the opposite edges of the strip come into engagement with each other during the formation of the tubular body, the two serrations on these edges will snap into each other and thus rigidly fix the position of the edges relative to each other.

The above-mentioned as well as additional features and advantages of the present invention will become more clearly apparent from the following detailed description thereof which is to be read with reference to the accompanying drawings, in which—

FIGURE 3 shows a top view of the pipe making machine according to FIGURE 2;

FIGURE 4 shows a partial section of the curved support for the tubular body;

FIGURE 5 shows a part of a pipe-making machine similar to that as shown in FIGURES 1 and 2, but provided with a pair of driving rollers in front of the welding point;

FIGURE 6 shows a top view of the pair of driving rollers according to FIGURE 5 and of the driving and control means therefor;

FIGURE 9 shows a top view of a metal strip while being fed so as to be formed into a tubular body and the front end of which is already formed, and of means for serrating the edges of the strip;

FIGURE 10 shows a perspective view of the elements according to FIGURE 9;

FIGURE 11 shows a partial section of the left edge portion of the serrated metal strip according to FIGURE 10 and of a hob for producing the serration;

FIGURE 12 shows a partial section of the right edge portion of the serrated metal strip according to FIGURE 10 and of a hob for producing the serration; while FIGURE 13 shows a perspective view of a metal strip the serrations of which are produced by punching.

Figure 1:
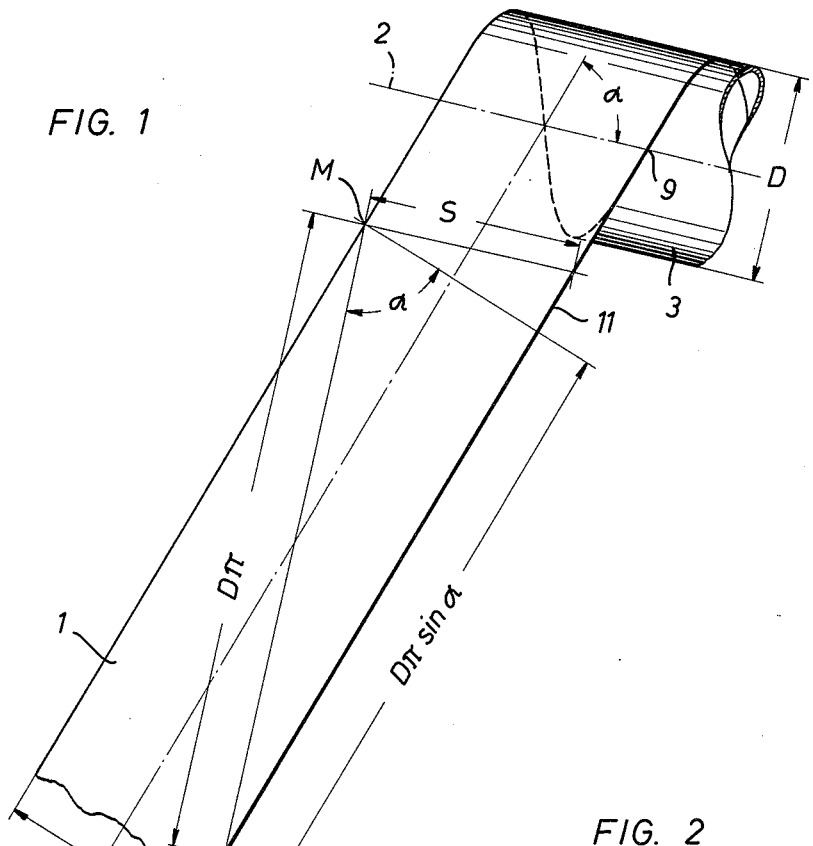
FIGURE 1 shows a top view of a metal strip while being fed so as to be formed into a tubular body and the front end of which is already formed.

As illustrated in FIGURE 1, the flat part of a metal strip 1 which is to be formed into a tubular body is provided at both edges with marks M, M which are applied simultaneously by means of an appliance as will later be described in detail so that the geometrical conditions as indicated in FIGURE 1 will always be fulfilled. This may be attained if the given distance $D\pi$ which is measured perpendicularly to the axis 2 of the tubular body 3 to be formed is marked on the surface of the strip. In FIGURE 1, D indicates the diameter of the tube to be produced, $D\pi$ its circumference, B the width of the strip stock to be worked upon, S the pitch of the helical seam, and $\alpha$ the angle of feed of the strip stock to the forming tool of the machine. It is evident that this marking will also comply with its purpose if strip stock is being used the width B of which varies within the usual tolerances of manufacture since the changes in the feeding angle $\alpha$ are also taken into account.

Figure 2:
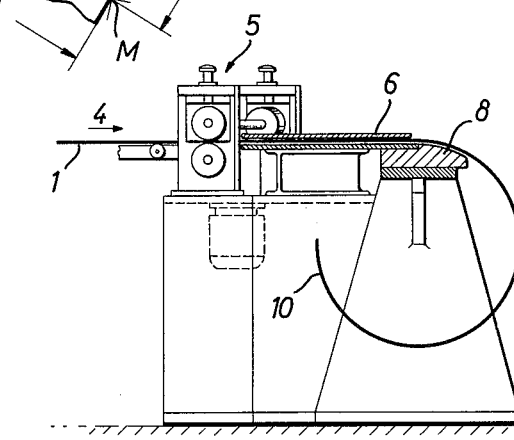
FIGURE 2 shows a side view, partly in section, of a helical seam pipe making machine according to the invention.

As illustrated in FIGURE 2, the strip stock 1 is fed in the direction of the arrow 4 to a feeding mechanism 5, the particular construction of which is immaterial insofar as the present invention is concerned, and it emerges freely at the end of a guide channel 6 which consists of guide plates. Strip 1 will then at first continue to move in the same feeding direction, but will then drop downward due to its gravity so as to rest on the surface 7 of a support 8. As shown in FIGURE 4, the radius of curvative r of this surface 7 is greater than the radius of curvature $\varsigma$ which results in the plastic deformation of the metal strip, but smaller than the radius of curvature R of the finished tube. As the strip further advances from the guide channel 6 and drops downwardly by gravity its starting end must then be lifted until its one edge is welded to the edge of the next turn of the tubular body which is being formed. In order to prevent the tubular body from becoming too oval, supporting rollers which are preferably adjustable vertically and horizontally may be provided at a suitable height so as already to support the first turn of the coiled strip.

In order to permit the curved edge 10 (FIGURE 2) while moving from below toward the welding point 9 (FIGURE 1) to be driven at an adjustable speed and to permit the speed of the curved edge to be regulated relative to the constant speed of the straight edge 11 of the strip, a pair of driving rollers 12 is provided, as shown in FIGURES 5 and 6, so that the speed of the freely moving curved edge 10 may be either accelerated or retarded. One of the two driving rollers 12 is pivotably mounted at 13 and acted upon, for example, by a spring 14, while the other roller is driven, if necessary, through an intermediate gear, by a motor 15, the speed of which is adjustable by a control unit 16. The speed of movement of the edge 10 of the strip toward the welding point may therefore be accelerated or retarded.

Figure 7:
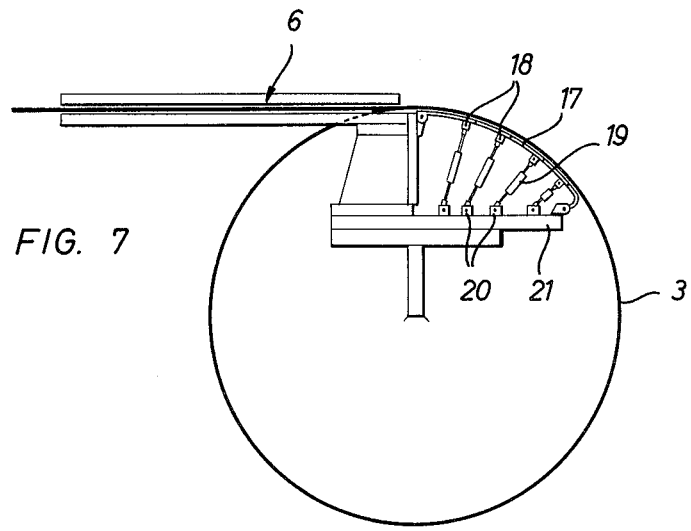
FIGURE 7 shows a side view of a support with an adjustable supporting surface for the strip to be formed.

In place of a rigid support 8, it is also possible to provide a support, the supporting surface of which may be varied in shape. This is illustrated in FIGURE 7 in which adjacent to the outlet opening of the feed channel one edge of a flexible steel plate 17 is mounted which is provided with bearings 18 which are connected by turnbuckles or the like 19 to bearings 20 which, in turn, are mounted on a stationary bracket 21. By an adjustment of the turnbuckles 19 it is possible to vary the shape of the flexible steel plate 17.

Figure 8:
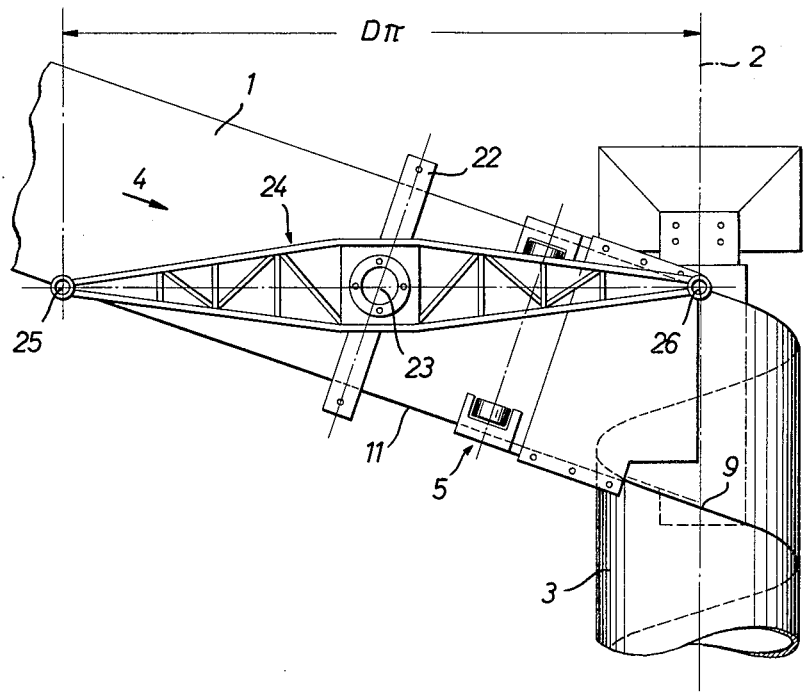
FIGURE 8 shows a top view of a helical seam pipe making machine which is provided with an apparatus for applying line marks on the metal strip before it is being formed.

In order to apply the line marks M on the flat strip 1, that is, before it is being bent, a two-armed lever 24, as shown in FIGURE 8, is mounted on a crossbar 22 so as to be pivotable about a vertical axis 23. The two free ends of lever 24 are provided with marking devices 25 and 26 which are preferably adjustable to permit their distance from each other to be adjusted in accordance with the circumference $D\pi$ of the tubular body to be made. As will be seen on the drawing, the marking device 26 is located within a plane which extends vertically to the axis of the tubular body to be made. Of course, crossbar 22 may be mounted at any suitable distance from the feeding mechanism 5.

Although in actual practice the machine according to the invention will also be provided with suitable means, such as supporting rollers or the like for supporting the completed tubular body, these means are not shown in the drawings since they are not material to the invention.

FIGURE 9 is in principle similar to FIGURE 1. The distance between the two marks M is again equal to the circumference $D \cdot \pi$ of the tubular body 3 to be produced, the longitudinal axis of which is indicated at 2. The marking points M are applied on the surface of strip 1 before it is bent. The welding point is indicated at 9, the angle of feed of strip 1 relative to the forming tool (not shown) at $\alpha$, the diameter of the tubular body 3 at D, the width of the strip at B, and the pitch of the helical seam at S.

Although it is possible to provide serrating devices V for the two edges of strip 1 at the points where the marks M are applied, it is more advisable to mount them substantially opposite to each other. These two serrating devices V which are associated with the left and right edges of the strip are illustrated in FIGURE 9 as being offset relative to each other by the distance $x$, as seen in the direction of feed of the strip to the forming tool. The device V for serrating the right edge of the strip therefore lies beyond the serrating device for the left edge, as seen in the diameter of feed. Assuming that the spacing between the teeth of the serration has a size $y$ and that $n$ divisions are equal to the value $D \cdot \pi \cdot \sin \alpha$, the distance $x$ will be zero. If the two values differ from each other, then $x$ will be equal to $\pi D \sin \alpha - n \cdot y$. The difference $x$ between the two mentioned values amounts in actual practice to a fraction of one division $y$, and is therefore relatively small. The value $x$ is therefore in a constant ratio to the length of the circumference $D \times \pi$ of the tubular body to be formed.

As illustrated in FIGURE 10, the serrations 32 on the left edge and the serrations 33 on the right edge of strip 1 are produced by two hobs 30 and 31, respectively. It is advisable to insure that the axis 34 of hob 30 lies a certain distance, for example, the distance $h$, underneath the lower surface 1' of strip 1 and the axis 35 of hob 31 a certain distance, for example, the same distance $h$, above the upper surface 1" of strip 1 so that sloping teeth are produced, as illustrated in FIGURES 11 and 12. If the flat strip which is provided with a serration along each edge is formed into a tubular body by a forming tool, not shown, the two serrations 32 and 33 will interengage with each other and definitely fix the two edges of the strip in the proper position to each other so that they only need to be welded together, for example, by an internal welding appliance 36. Of course, in place of such an internal welding appliance an external welding appliance may also be used or both an internal and an external welding appliance.

Instead of producing the serrations by means of hobs 30 and 31, it is also possible to do this by other means. Thus, for example, it is assumed in FIGURE 13 that the two serrations are produced by punching. These serrations 37 and 38 are therefore exactly alike, except that they are offset relative to each other in the direction of feed of the strip.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing tubular bodies with welded helical seams, such as pipes or the like, from metal strip comprising the steps of simultaneously placing marks on opposite lateral edges of said strip which marks are spaced apart at distances which are functions of the length of the circumference of the tubular body to be formed, guiding said strip in a curvilinear direction, utilizing the force of gravity for determining the degree of curvature in said curvilinear direction, applying a driving force for coiling said strip about a longitudinal axis, and engaging adjacent ones of said opposite lateral edges to cause said marks on one of said adjacent ones to successively assume substantially identical relationships with the marks on the other one of said adjacent ones of said lateral edges, and successively welding together said adjacent ones of said edges at a predetermined welding point.

2. An apparatus for producing tubular metal bodies such as pipes from metal strip comprising marking means for simultaneously placing marks on opposite lateral edges of said strip, which marks are spaced apart at distances which are functions of the length of the circumference of the tubular body to be formed, guide channel means for said strip having an end supporting means for said strip adjacent said end of said guide channel means, said supporting means being effective to guide said strip lengthwise downwardly under the influence of gravity in a curvilinear direction, driving roller means receiving said strip and feeding said strip in a direction such as to bring two of said lateral edges into a mutually adjacent relationship in which said marks on one of said adjacent lateral edges are in substantially identical relationships with the said marks on the other of said adjacent lateral edges, and means for welding together said adjacent lateral edges.

3. An apparatus for carrying out the method according to claim 2, wherein said supporting means comprises at least one support for the metal strip, the supporting points of which are located on a surface having a radius of curvature greater than the radius of curvature leading to the plastic deformation of the strip but smaller than the radius of curvature of the finished tubular body.

4. An apparatus as defined in claim 3, wherein said roller driving means comprises at least one pair of driving rollers which is adapted to engage with said strip at the opposite sides thereof and at least one roller of which is driven, and wherein the peripheral speed of said driving rollers normally corresponds to the feeding speed of said strip but is adapted to be varied.

5. An apparatus as defined in claim 4, wherein the lines of contact between the driving rollers and the formed strip extend to the direction of movement at an angle differing from a right angle.

6. An apparatus as defined in claim 3, wherein said supporting means comprises a supporting surface, the shape of said supporting surface being variable.

7. An apparatus as defined in claim 2, wherein said marking means comprises a two-armed lever having a pivoting axis intersecting the center line of said metal strip to be formed and extending vertically to the plane of said strip, each arm of said lever carrying a marking device at the same but variable distance as the other arm from said pivoting axis.

8. An apparatus as defined in claim 2, wherein said marking means consist of serrating means, such as hobs, punches, or the like.

9. An apparatus as defined in claim 8, wherein said serrating means comprises hobs, the axis of rotation of one hob being disposed above and that of the other hob below the central plane of the strip.

10. An apparatus as defined in claim 9, wherein the distances between said axes of rotation of the hobs and the central plane of said strip are equal.

References Cited by the Examiner

UNITED STATES PATENTS

| 246,232 | 8/1881 | Spences | 113—35 |
| 378,769 | 2/1888 | Coas | 219—62 |
| 478,669 | 7/1892 | Welch | 219—62 |
| 1,407,001 | 2/1922 | Schroder | 113—35 |
| 1,689,374 | 10/1928 | Williams | 219—62 |
| 1,832,059 | 11/1931 | Stresau | 219—62 |
| 2,301,092 | 11/1942 | Thompson et al. | 93—80 |
| 3,072,172 | 1/1963 | Ohnstad | 113—35 |

CHARLES W. LANHAM, *Primary Examiner.*

WILLIAM J. STEPHENSON, *Examiner.*